Sept. 17, 1957  R. E. SLAUGHTER  2,806,467
OVEN SHELF
Filed May 18, 1955

INVENTOR.
ROY E. SLAUGHTER
BY *Arthur H. Robert*
ATTORNEY

United States Patent Office 2,806,467
Patented Sept. 17, 1957

2,806,467

OVEN SHELF

Roy E. Slaughter, Louisville, Ky.

Application May 18, 1955, Serial No. 509,184

3 Claims. (Cl. 126—337)

The present invention relates to an improved oven shelf.

In the conventional home cooking range, the oven contains two slidable wire shelves for holding baking containers. Ordinarily, to remove a baking container the operator grasps the end of the shelf and draws it out until the baking container is accessible. When the shelves are hot the operator will use some insulation cloth for protecting the fingers from the shelf that is grasped, but because of the proximity of the other shelf, there is danger of contacting the other hot shelf with the bare hand.

It is an object of the present invention to provide a protective handle on an oven shelf which enables the handling of the hot shelf without danger of burning the hand.

A further object is the provision of an oven shelf having an automatically extensible and retractible handle to facilitate manipulating the shelf.

The invention is described in detail in the following specification taken in connection with the accompanying drawing illustrating a preferred embodiment of the invention by way of example, and wherein.

Figure 1:
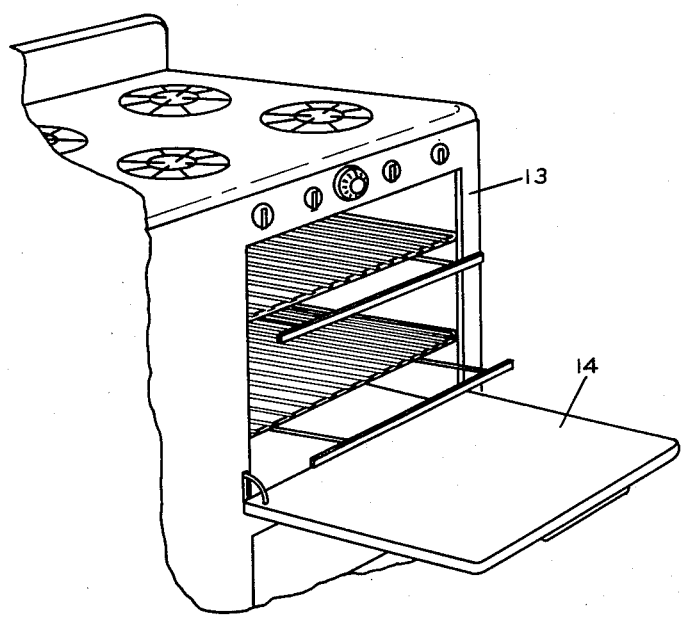
Figure 1 is a perspective view showing an oven containing shelves embodying the invention.
Figure 2:
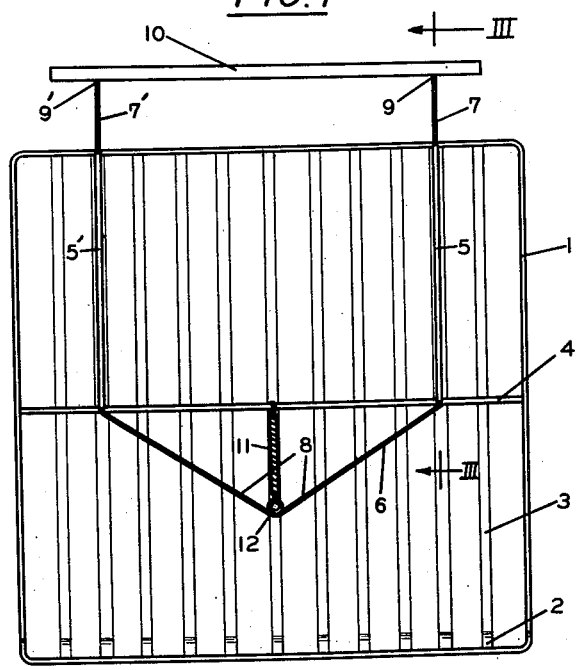
Figure 2 is a bottom view of a shelf embodying the invention.
Figure 3:
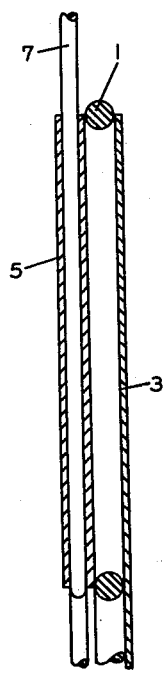
Figure 3 is a section taken on line III—III of Figure 2.

Referring to the drawing, the oven shelf comprises a conventional wire frame 1, which may be bent up at one end 2, as is usual. A plurality of flat or round slats 3 may be welded to the upper face of the frame, and a cross brace 4 is welded in place, preferably flush with the frame.

A pair of bearing tubes 5, 5' are welded to the frame 1 and cross brace 4 on the underside, and a wire frame generally indicated at 6 has side members 7, 7' received in the bearings 5, 5' for sliding movement. At one end the frame 6 is bent into a V shape indicated at 8, and the ends 9, 9' are suitably secured to a cross bar 10, serving as a handle, as by welding.

One end of spring 11 is hooked over cross brace 4, and the other end is received in an eye 12 suitably formed on the V-shaped portion of the frame, preferably at the apex. It will be seen that the spring 11 biases the frame 6 so as to tend to project the handle portion 10 outwardly.

As illustrated in Figure 1, the gas range 13 has two shelves in the oven compartment, suitably supported for sliding movement. When the oven door 14 is closed, it engages the handle bars 10 and slides them inwardly in their bearings, 5, 5', to retracted position, so that they do not interfere with closing of the oven door. In closed position of the door, the door retains the handles in retracted position.

When the oven door is opened, the spring 11 projects the handle forward, until the V portion 8, engaging the bearing tubes 5, 5' stops the projecting motion. The handle 10 of the lower shelf projects out of the oven and now is easily grasped without danger of burning the hand or fingers by contact with the upper shelf.

It will be understood the lower shelf may be constructed so its handle 10 projects outward slightly more than the handle of the upper shelf, so as to reduce the possibility of the hand or fingers contacting the handle of the upper shelf when removing the lower shelf.

I claim as my invention:

1. A shelf for an oven comprising: a shelf frame having a front edge; a handle mounted on said frame for movement to retracted and forwardly extended positions relative to said edge, said handle being adapted to be held in retracted position by the oven door in closed position; and spring means biasing said handle toward said extended position so as to move it thereto when said oven door is opened.

2. A shelf as specified in claim 1 wherein: said handle comprises a bar; and said mounting on the shelf frame comprises guide means on the under side of said shelf frame and a handle frame comprising rods slidably supported in said guide means for forward-rearward movement and carrying said handle adjacent their forward ends.

3. A shelf as specified in claim 2 wherein: said rods are joined at their rear ends; and said spring means includes a spring anchored, at one end, to the rear end of said rods, and, at the other end, to said shelf frame.

References Cited in the file of this patent

UNITED STATES PATENTS

| | | |
|---|---|---|
| 640,580 | Miller | Jan. 2, 1900 |
| 1,618,567 | Brown | Feb. 22, 1927 |
| 2,290,572 | Rakov | July 21, 1942 |